United States Patent
Fontaine et al.

(10) Patent No.: US 11,069,362 B2
(45) Date of Patent: Jul. 20, 2021

(54) DEVICE AND METHOD FOR PRIVACY-PRESERVING VOCAL INTERACTION

(71) Applicant: INTERDIGITAL CE PATENT HOLDINGS, Paris (FR)

(72) Inventors: Patrick Fontaine, Rennes (FR); Christoph Neumann, Rennes (FR)

(73) Assignee: INTERDIGITAL CE PATENT HOLDINGS, Paris (FR)

(*) Notice: Subject to any disclaimer, the term of this patent is extended or adjusted under 35 U.S.C. 154(b) by 280 days.

(21) Appl. No.: 16/213,187

(22) Filed: Dec. 7, 2018

(65) Prior Publication Data
US 2019/0180759 A1     Jun. 13, 2019

(30) Foreign Application Priority Data
Dec. 7, 2017 (EP) .................................. 17306719

(51) Int. Cl.
| G10L 17/22 | (2013.01) |
| G10L 17/00 | (2013.01) |
| G10L 15/22 | (2006.01) |
| G06F 21/62 | (2013.01) |
| H04M 3/42 | (2006.01) |
| G10L 13/00 | (2006.01) |
| H04W 12/02 | (2009.01) |

(52) U.S. Cl.
CPC .......... *G10L 17/22* (2013.01); *G06F 21/6254* (2013.01); *G10L 13/00* (2013.01); *G10L 15/22* (2013.01); *G10L 17/00* (2013.01); *H04M 3/42008* (2013.01); *H04W 12/02* (2013.01)

(58) Field of Classification Search
CPC .......... G10L 17/00; G10L 15/22; G10L 17/22
See application file for complete search history.

(56) References Cited

U.S. PATENT DOCUMENTS

| 8,473,451 | B1 | 6/2013 | Hakkani-Tur et al. |
| 9,131,369 | B2 | 9/2015 | Ganong, III et al. |
| 9,514,741 | B2 | 12/2016 | Jost et al. |
| 2004/0047461 | A1 | 3/2004 | Weisman et al. |
| 2014/0278366 | A1 | 9/2014 | Jacob et al. |
| 2017/0040018 | A1 | 2/2017 | Tormey |
| 2018/0053504 | A1* | 2/2018 | Wang ....................... G06F 3/167 |

(Continued)

OTHER PUBLICATIONS

Welch, C., "Amazon's Alexa can now recognize different voices and give personalized responses", The Verge, https://www.theverge.com/circuitbreaker/2017/10/11/16460120/amazon-echo-multi-user-voice-new-feature, Oct. 11, 2017, pp. 1-3.

(Continued)

*Primary Examiner* — Samuel G Neway
(74) *Attorney, Agent, or Firm* — Invention Mine LLC

(57) ABSTRACT

A home assistant device and a method for privacy-preserving vocal interactions. A microphone captures an audio signal corresponding to a vocal user query. The identity of the speaker is determined, and an obfuscated name is generated corresponding to the identified speaker. The audio signal is analysed to determine the intent of the user and a personalized answer is generated in combination with the obfuscated name. This answer is then de-obfuscated by reintroducing the speaker name. The de-obfuscated answer is rendered to the speaker.

20 Claims, 3 Drawing Sheets

(56) References Cited

U.S. PATENT DOCUMENTS

2018/0338038 A1* 11/2018 Ly .................. H04L 65/1069
2019/0180759 A1* 6/2019 Fontaine ............... G10L 13/00

OTHER PUBLICATIONS

Campagna et al., "Almond: The Architecture of an Open, Crowdsourced, Privacy-Preserving, Programmable Virtual Assistant", 2017 International World Wide Web Conference Committee (IW3C2), Perth, Australia, Apr. 3, 2017, pp. 1-10.

Hadian et al., "Efficient and Privacy-preserving Voice-based Search over mHealth Data", 2017 IEEE/ACM International Conference on Connected Health: Applications, Systems and Engineering Technologies (CHASE), Philadelphia, Pennsylvania, USA, Jul. 17, 2017, pp. 96-101.

Pathak, M., "Privacy-Preserving Machine Learning for Speech Processing", Doctor of Philosophy Thesis, Carnegie Mellon University, School of Computer Science, Language Technologies Institute, Apr. 26, 2012, pp. 1-159.

Mukhopadhyay et al., "All Your Voices Are Belong to Us: Stealing Voices to Fool Humans and Machines", 20th European Symposium on Research in Computer Security (ESORICS), Vienna, Austria, Sep. 21, 2015, pp. 1-20.

Larcher et al., "Logiciel: Sidekit", Sidekit: Laboratoire d'Informatique de l'Université du Mans, http://lium.univ-lemans.fr/sidekit/, retrieved on Nov. 16, 2018, pp. 1-3.

\* cited by examiner

DEVICE AND METHOD FOR PRIVACY-PRESERVING VOCAL INTERACTION

REFERENCE TO RELATED EUROPEAN APPLICATION

This application claims priority from European Patent Application No. 17306719.0, entitled "DEVICE AND METHOD FOR PRIVACY-PRESERVING VOCAL INTERACTION", filed on Dec. 7, 2017, the contents of which are hereby incorporated by reference in its entirety.

TECHNICAL FIELD

The present disclosure relates to the domain of vocal interactions and more particularly preserves the privacy of users in a multi-users home assistant environment.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The use of voice control in the residential environment through home assistant devices such as Amazon Echo or Google Home as well as home assistant services such as Microsoft Cortana or Apple Siri has become a mass market reality; such devices or services are used in millions of homes. A home assistant device captures natural speech from users of the household through microphones, analyses the user query and provides appropriate response or service. The queries to be performed can make use of in-home devices (e.g.: muting the sound of the TV off, closing shutters, etc.) but also out-of-home services (e.g.: retrieving the weather forecast or stock values, getting help about a device failure, etc.). In addition, the latest generation of home assistant device also performs speaker recognition. Such recognition enables multiple features such as access control (e.g.: a kid cannot configure the home network, cannot access adult movies, etc.), personalisation of the interactions (e.g.: the vocabulary of the interaction can be adapted to the category of speaker chosen among young kids, teenagers, adults or senior persons). However, this comes at the cost of decreased user privacy. Indeed, the speech analysis and conversation logic that are used in these vocal interaction ecosystems are conventionally operated outside the home environment, typically in the cloud.

It can therefore be appreciated that there is a need for a solution for residential speaker recognition that addresses at least some of the problems of the prior art. The present disclosure provides such a solution.

SUMMARY

The present disclosure describes a home assistant device and a method for privacy-preserving vocal interactions. A microphone captures an audio signal corresponding to a vocal user query. The identity of the speaker is determined, and an obfuscated name is generated corresponding to the identified speaker. The audio signal is analysed to determine the intent of the user and a personalized answer is generated in combination with the obfuscated name. This answer is then de-obfuscated by reintroducing the speaker name. The de-obfuscated answer is then rendered to the speaker.

In a first aspect, the disclosure is directed to a device for performing privacy-preserving vocal interactions comprising: a microphone configured to capture an audio signal representative of a vocal utterance relative to a query from a speaker; a speaker identifier configured to determine the identity of a speaker from the captured audio signal; a privacy enforcer configured to generate an obfuscated speaker name corresponding to the identified speaker and store a list of correspondences between speaker names and obfuscated speaker names; a communication interface configured to provide to an external device the captured audio signal and the obfuscated speaker name; receive from an external device an answer to the speaker query; wherein the privacy enforcer is further configured to determine if the received answer contains an obfuscated speaker name of the list and in this case to replace, in the received answer, the obfuscated speaker name by the corresponding name, thus generating an de-obfuscated answer.

In a first variant of first aspect, the received answer is in textual form and the device further comprises a text-to-speech converter configured to transform the de-obfuscated answer from textual form into an audio signal.

In a second variant of first aspect, the received answer is in audio format and the privacy enforcer is further configured to obfuscate the captured audio signal by detecting a speaker name of the list and replacing it by an audio signal representative of the corresponding obfuscated speaker name.

In a third variant of first aspect, the privacy enforcer further comprises a setting to turn an incognito mode on or off wherein in the first case, the privacy enforcer obfuscates the speaker name before providing it and de-obfuscates the received answer when it contains an obfuscated speaker name, and in the second case, the privacy enforcer no more obfuscates the speaker name and no more determines if the received answer contains an obfuscated speaker name.

In a second aspect, the disclosure is directed to a method for performing privacy preserving vocal interactions comprising: capturing an audio signal representative of a vocal utterance relative to a query from a speaker; identifying speaker from the captured audio signal; generating an obfuscated speaker name corresponding to the identified speaker and store a list of correspondence between speaker names and obfuscated speaker names; providing to an external device the captured audio signal and the obfuscated speaker name; obtaining from an external device an answer to the query; determining if the received answer contains an obfuscated speaker name of the list and in this case to replace, in the received answer, the obfuscated speaker name by the corresponding name, thus generating an de-obfuscated answer; and provide the answer to the speaker.

In a first variant of second aspect, the received answer is in textual form and the method further comprises detecting a speaker name of the list and replacing it by an audio signal representative of the corresponding obfuscated speaker name.

A second variant of second aspect further comprises a setting to turn an incognito mode on or off wherein in the first case, obfuscating the speaker name before providing it and de-obfuscating the received answer when it contains an obfuscated speaker name, and in the second case, no more obfuscating the speaker name and no more determining if the received answer contains an obfuscated speaker name.

A third variant of second aspect comprises renewing the obfuscated speaker names.

In a third aspect, the disclosure is directed to a computer program comprising program code instructions executable by a processor for implementing any embodiment of the method of the second aspect.

In a fourth aspect, the disclosure is directed to a computer program product which is stored on a non-transitory computer readable medium and comprises program code instructions executable by a processor for implementing any embodiment of the method of the second aspect.

BRIEF DESCRIPTION OF DRAWINGS

Preferred features of the present disclosure will now be described, by way of non-limiting example, with reference to the accompanying drawings, in which.

DESCRIPTION OF EMBODIMENTS

Figure 1A:
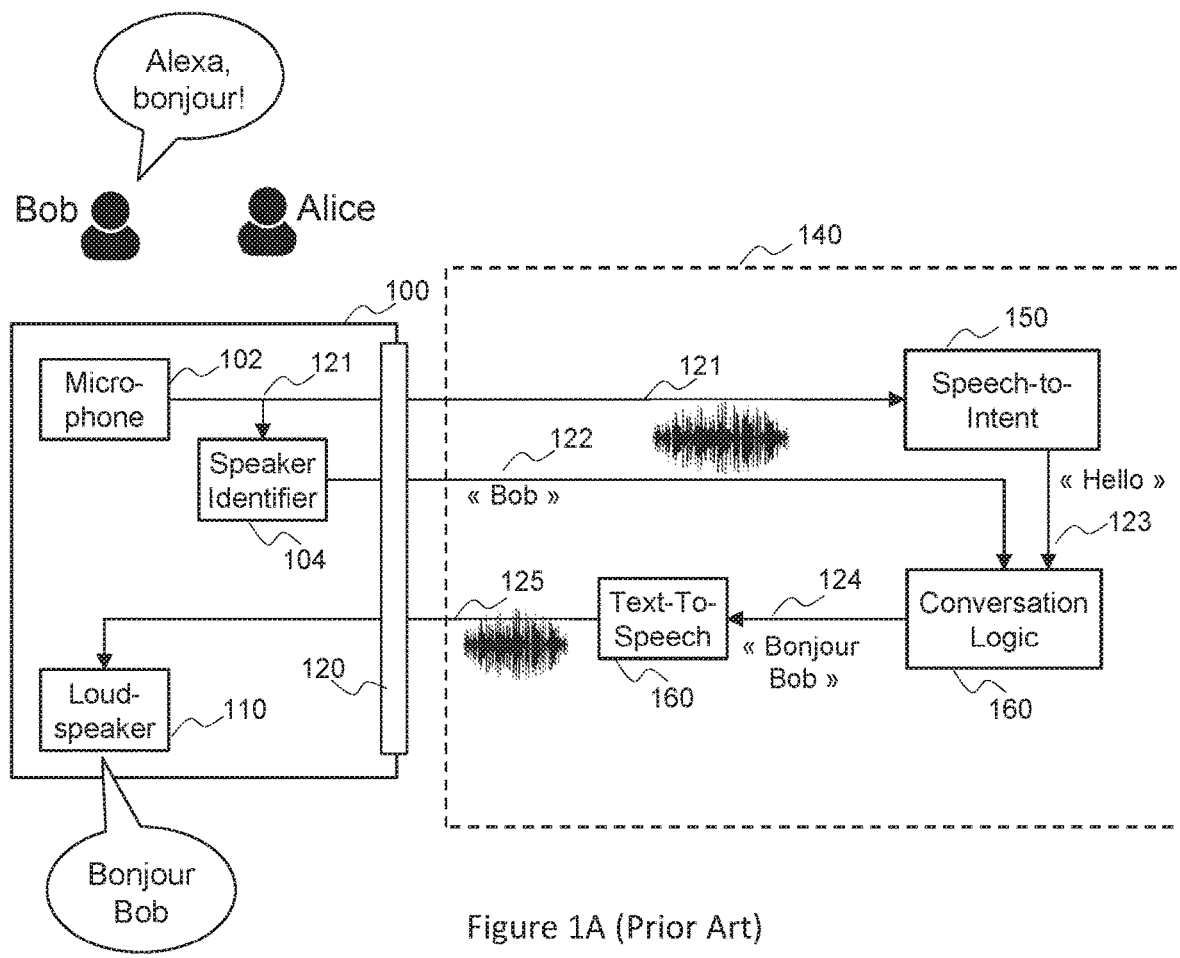
FIG. 1A illustrates an exemplary home assistant ecosystem according to the prior art.

FIG. 1A illustrates an exemplary home assistant ecosystem according to the prior art. The person skilled in the art will appreciate that the illustrated device is simplified for reasons of clarity. The home assistant ecosystem comprises at least a home assistant device 100 that interacts with service providers through a communication interface 120. Service providers propose a plurality of services to the user, with the particularity that the services are based on vocal interactions and personalized towards individual users. The services are provided by dedicated software applications that collaborate to answer to the speaker's request. These software applications are conventionally executed on out-of-the-home devices, typically in the cloud and can be operated by a single service operator 140 as illustrated in FIG. 1A or can be split between a plurality of service providers collaborating.

The home assistant device comprises a microphone 102 to capture the vocal utterances generated by the user making a vocal query and to generate the corresponding audio signal 121. A speaker identifier module 104 analyses the audio signal 121 to identify the speaker among the set of users of the household and provides the speaker identity 122 to the service provider 140. The speech-to-intent 150 receives the audio signal 121, analyses it, transforms it into text and generates an intent. A "speech-to-intent" function is different from a "speech-to-text" function. Indeed, an intent corresponds to a concept and is more general than a simple recognized word. For example, the intent can be "hello" when speakers say "guten Tag", "bonjour", "hi", etc. . . . The conversation logic 160 receives the intent 123 and the speaker identity 122. Being aware of the previous interactions with the speaker, the conversation logic 160 generates an appropriate answer 124, in response to the latest intent. Since the conversation logic is aware of the speaker identity, it personalizes the answer, for example, by inserting the name of the speaker in the response. The answer 124 is a text string and is provided to the text-to-speech 160 that transforms it into an audio signal 125 delivered to the home assistant device and rendered on the loudspeaker 110.

For example, as illustrated in FIG. 1A, when user Bob wants to interact with the ecosystem, he starts by a simple query "Alexa, bonjour!" in the case of the Amazon ecosystem. The ecosystem will answer by saying "Bonjour Bob", thus personalizing the response by inserting the name of the recognized speaker.

With such a setup, the home assistant device 100 provides to the service providers the identity of the speaker. However, users do not always want their identity to be disclosed and expect improvements regarding their privacy.

Figure 1B:
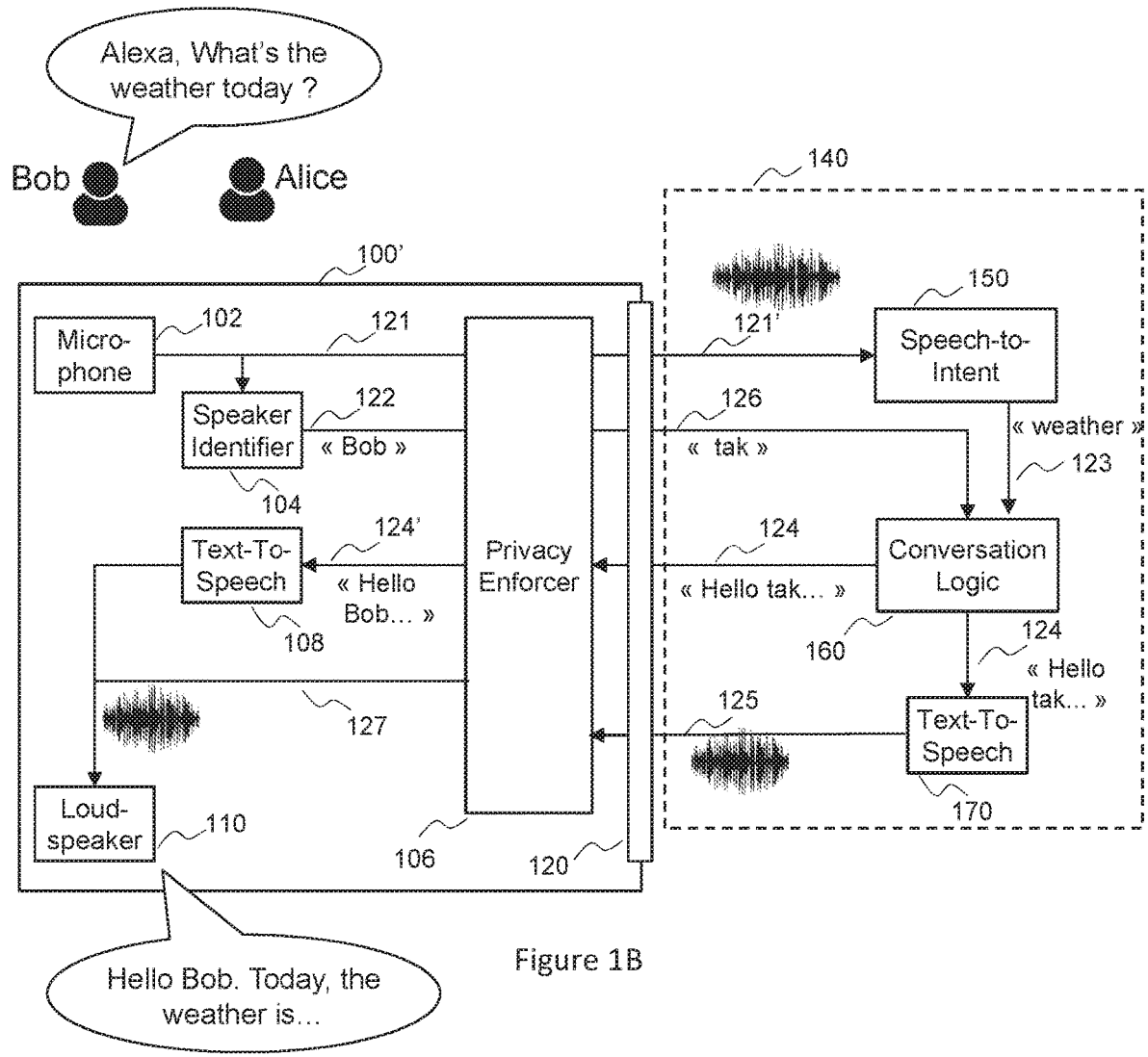
FIG. 1B illustrates an exemplary home assistant ecosystem in which at least part of the disclosure may be implemented.

FIG. 1B illustrates an exemplary home assistant ecosystem in which at least part of the disclosure may be implemented. The home assistant ecosystem comprises a privacy-friendly home assistant device 100' and can operate with exactly the same service operator environment 140 as in prior art system described in FIG. 1A while improving the privacy of the speaker.

The home assistant device 100' comprises a microphone 102 configured to capture audio from users, a speaker identifier 104 configured to detect the identity of the speaker among the household users, a privacy enforcer 106 configured to obfuscate the identity of the speaker in the outgoing data by replacing the speaker name by a temporary name and insert it back in the incoming data, an optional text-to-speech converter 108 configured to transform the textual answers into voice signal, a loudspeaker 110 configured to output the audio signal and a communication interface 120. The home assistant device 100' also comprises other elements that are not illustrated since not relevant to the invention (such as buttons to configure the system, power supply to operate the electronic components, audio amplifier to drive the loudspeaker, etc.) but essential for operating the device. The home assistant device 100' can be implemented as a standalone device or can be integrated in a conventional consumer device such as a set-top box, a gateway, a television, a computer, a smartphone, a tablet, etc.

The communication interface 120 is configured to interact with out-of-the-home devices such as data servers and processors in the cloud performing at least the speech-to-intent and the conversational logic functions. ADSL, cable modem, 3G or 4G are examples of communication interfaces that may be used for this purpose. Other communication interfaces may be used.

The home assistant device 100' operates in one of two modes, depending on the type of answer provided by the conversation logic to the home assistant device 100'. A first mode is used when the conversation logic 160 delivers the answer in text format. In this case, the text-to-speech converter 170 of the service provider 140 is not used and the conversion to audio is done within the home assistant device 100' by the text-to-speech converter 108. A second mode is used with legacy service providers where the answer is delivered as an audio signal thus using the text-to-speech converter 170 of the service provider 140.

According to a preferred embodiment, the home assistant ecosystem operates in the first mode. The speaker generates a vocal utterance to make a vocal query, such as "Alexa, what's the weather today?". The microphone 102 captures this vocal utterance and generates the corresponding audio signal 121. The speaker identifier module 104 analyses the audio signal 121 and identifies the speaker as being speaker whose identifier is XYZ-002 and whose name is Bob. Such identification is for example done using conventional speaker recognition technologies such as classification using GMM-UBM models (Gaussian Mixture Model—Universal Background Model). Once a speaker has been identified, the speaker name 122 is provided to the privacy enforcer 106 that generates a temporary name 126 (in the example of FIG. 1B: "tak") and provides it to the service provider 140 thereby obfuscating the real name and identity of the speaker. The privacy enforcer 106 stores the relationship between the speaker identifier and the obfuscated name 126. This is done for example by storing the association between the name of the identified speaker (or its local identifier/profile) and the obfuscated name in a mapping table. The table 1 show an example of such a mapping table.

TABLE 1

Mapping table

| # | Name | Obfuscated name |
|---|------|-----------------|
| XYZ-001 | Alice | okul |
| XYZ-002 | Bob | tak |
| XYZ-003 | Charlie | wakbo |
| XYZ-004 | Eleonore | dragopasa |

Multiple techniques could be used to generate the obfuscated name such as generating a random text string or selecting randomly one element in a list of random texts that are different from the names of the household. An obfuscated name preferably does not correspond to a common name or a common word. To ensure this, a generated random text can be used only if it is not part of a dictionary of names and a conventional dictionary. When it is not the case, a new generation must be done.

The privacy enforcer 106 then provides the audio signal 121' and the obfuscated name 126 to the service operator 140. The speech-to-intent 150 analyses the received audio signal 121' and generates a corresponding intent 123. The conversation logic 160 then analyses the intent 123 and generates a personalized answer 124 for example comprising the obfuscated name. This answer is then directly sent back to the home assistant device 100' in textual form. The privacy enforcer 106 analyses the received answer 124 and checks if it contains an obfuscated name of the list of obfuscated names of the mapping table. When it is the case, the detected obfuscated name is replaced by the corresponding speaker name, thus generating the de-obfuscated answer 124' that is transformed by the text-to-speech converter 108 into an audio signal 127 rendered by the loudspeaker 110.

In the example illustrated in FIG. 1B, Bob says "Alexa, what's the weather today?" The speaker is identified as "Bob" and thus, the corresponding obfuscated name is "tak". The audio analysis reveals that the intent was "weather today". Today's weather report is then fetched and the answer is personalized by adding the name of the speaker: "Hello tak. The weather today is . . . ", still comprising the obfuscated speaker name. When the answer is analysed, one of the obfuscated speaker names of the list ("tak") is detected. It is replaced by the corresponding real speaker name "Bob" therefore generating the final response "Hello Bob. The weather today is . . . ". The result is that the speaker name was not disclosed outside of the home assistant device 100' therefore preserving the privacy of the plurality of users of the home assistant device.

According to alternate embodiment, the home assistant ecosystem operates in the second mode. The difference from the first mode is that when the conversation logic generates the answer 124, this answer is not provided to the home assistant device 100' directly in textual form but in an audio form since an audio signal 125 is generated by the text-to-speech converter 170 of the service provider 140. Therefore, when the home assistant device 100' receives the answer 125, the privacy enforcer 106 analyses the audio signal 125 to detect the obfuscated name. For that purpose, the privacy enforcer obtains audio representations of the obfuscated names and searches for these representations within the audio signal 125 in the audio domain for example using a cross-correlation of the two audio signals. When an obfuscated name is found, it is replaced by the corresponding speaker name thus generating the de-obfuscated answer 127 that is rendered by the loudspeaker 110.

In this second mode, the chosen obfuscated name may have similar length as the speaker name as illustrated in table 1. Alternatively, it may also have a fixed length to avoid providing information that could be used to determine the number of people of the household. One example of technique for generating such obfuscated name is to alternate a random consonant and a random vowel over a fixed number of letters. In such case, example of obfuscated names for table 1 could be "kadopabo", "jilybelo", "gatekomu" and "dagopasa".

In an alternate embodiment, for improved privacy the recorded audio signal 121 is modified by the privacy enforcer into another audio signal 121' so that the vocal characteristics of the recorded voice cannot be recognized. This is done using any voice transformation algorithm (voice morphing, prosodic modifications, or even applying speech-to-text followed by text-to-speech, etc.), thus transforming the characteristics without altering the text that is spoken. The result of such transformation would be that all voices leaving the home network are the same and thus become indistinguishable. This additional safeguard applies to both modes.

In an alternate embodiment, the privacy enforcer also obfuscates the text of the outgoing audio signal 121' from the recorder audio signal 121. This is done by detecting, within the audio signal, one of the names of the speakers of the household, as listed for example in the mapping table of table 1. When a speaker name is found, it is replaced by the corresponding obfuscated name. This embodiment is optional since it can lead to unsuccessful queries in some situations. For example, if this feature is activated, with the table 1 above, it would not be possible to watch the movie "Alice in Wonderland" since the query would be transformed to "okul in Wonderland".

In an alternate embodiment, the obfuscation is renewed periodically under control of a default setting, a user choice or a setting in user preferences, for example at each startup of the device, every day, every 15 minutes, for each query, etc. The case where the obfuscation is renewed for each query improves unlinkability between two successive requests. However, it comes with the drawback of reduced contextualization of the query since the conversation logic will always start from an empty context after each renewal since it is performed by a supposedly new speaker.

According to an embodiment, the privacy enforcer 106 can be turned on or turned off, for example under control of a user choice or a setting in user preferences. This controls the level of privacy provided by the privacy enforcer and thus is named privacy level setting. When the privacy level setting is "NO_PRIVACY", the privacy enforcer 106 is completely transparent: it does not impact the outgoing queries of the home assistant device 100' and does not modify the incoming results. When the privacy level setting is "INCOGNITO", the privacy enforcer 106 is fully active: it analyses the outgoing queries to obfuscate the speaker name in the query, removes any speaker name from the audio, transforms the outgoing voice query, and restores the speaker name in the incoming results. Other intermediate privacy level settings are also possible, for example without performing the voice transformation.

According to an embodiment, the privacy level setting can be adjusted using an audio query itself, such a "start private mode", "start incognito mode", "hide my identity", etc. to enable the privacy enforcer and "stop private mode", "stop incognito mode", etc. to bypass the privacy enforcer. This query is detected by the privacy enforcer that adjusts its behaviour accordingly.

Figure 2:
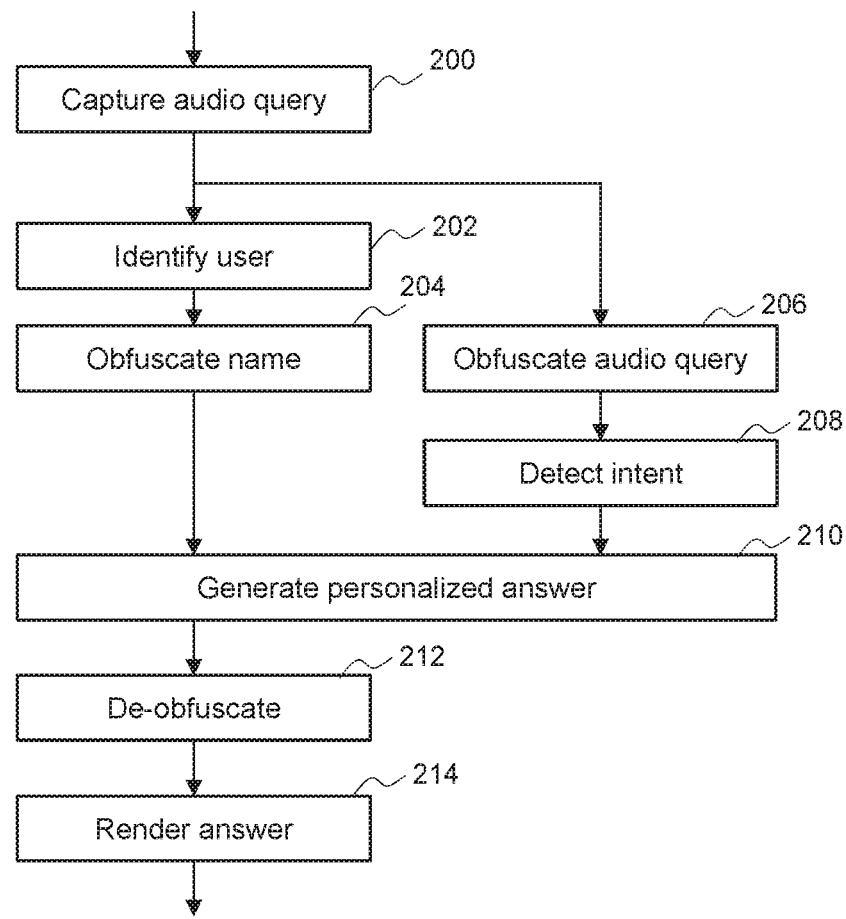
FIG. 2 illustrates an exemplary flowchart of a method of privacy-preserving vocal interaction according to an embodiment of the disclosure.

FIG. 2 illustrates an exemplary flowchart of a method of privacy-preserving vocal interaction according to an embodiment of the disclosure. In step 200, the microphone captures the vocal utterances performed by the user forming a vocal query and generates the corresponding audio signal. In step 202, the speaker identifier identifies the identity of the speaker of the captured audio signal and in step 204 the privacy enforcer generates an obfuscated speaker name. Optionally, in parallel step 206, the privacy enforcer obfuscates the audio signal. In step 208, the audio signal is obtained, analysed and the corresponding intent is generated. In step 210, a personalized response is generated after obtaining the obfuscated speaker name. In step 212, the response is analysed by the privacy enforcer that replaces the obfuscated names of the response by the corresponding speaker names. In step 214, the loudspeakers render the de-obfuscated response. The obfuscation steps 204 and 206 and the de-obfuscation step 212 are under control of the privacy level settings and are bypassed when the settings are "NO_PRIVACY".

As will be appreciated by one skilled in the art, aspects of the present principles and features described above can take the form of an entirely hardware embodiment, an entirely software embodiment (including firmware, resident software, micro-code and so forth), or an embodiment combining hardware and software aspects. For example, although the description is done using hardware components for the speaker identifier 104, privacy enforcer 106 and text-to-speech converter 108, these elements can be implemented as software components using at least one hardware processor configured to execute a method of at least one embodiment of the present disclosure, memory configured to store data needed to execute a method of at least one embodiment of the present disclosure and computer readable program code executable by the processor to perform at least one embodiment of the present disclosure. Thus, in such implementation, the hardware processor is configured to implement at least the functions of the speaker identifier 104, privacy enforcer 106 and text-to-speech converter 108 and to interface with the service provider through the communication interface 120. For that purpose, the hardware processor is configured to implement at least the steps of FIG. 2 comprising the identify user step 202, obfuscate name step 204, obfuscate audio query step 206, de-obfuscate step 212 and render answer step 214.

Furthermore, although the different alternate embodiments have been described separately, they can be combined together in any form.

The invention claimed is:

1. A device for performing privacy-preserving vocal interactions comprising:
   a microphone configured to capture an audio signal representative of a vocal utterance relative to a query from a speaker;
   a speaker identifier configured to determine the identity of a speaker from the captured audio signal;
   a privacy enforcer configured to provide a first obfuscated speaker name corresponding to the identified speaker and store a list of correspondences between speaker names and obfuscated speaker names;
   a communication interface configured to:
      provide to an external device the captured audio signal and the first obfuscated speaker name;
      receive from an external device an answer to the speaker query;
   wherein the privacy enforcer is further configured to determine if the received answer contains the first obfuscated speaker name and in this case to replace, in the received answer, the first obfuscated speaker name by its corresponding name in the list.

2. The device of claim 1 further comprising providing the answer to the speaker.

3. The device of claim 1 wherein the received answer is in textual form.

4. The device of claim 3 further comprising a text-to-speech converter configured to transform the de-obfuscated answer from textual form into an audio signal.

5. The device of claim 1 wherein the received answer is in audio format.

6. The device of claim 1 wherein the privacy enforcer is further configured to obfuscate the captured audio signal by detecting a speaker name of the list and replacing it by an audio signal representative of the corresponding obfuscated speaker name.

7. The device of claim 1 wherein the privacy enforcer further comprises a setting to turn an incognito mode on or off wherein in the first case, the privacy enforcer obfuscates the speaker name before providing it and de-obfuscates the received answer when it contains an obfuscated speaker name, and in the second case, the privacy enforcer no more obfuscates the speaker name and no more determines if the received answer contains an obfuscated speaker name.

8. The device of claim 1 further comprising renewing the obfuscated speaker names of the list.

9. A method for performing privacy preserving vocal interactions comprising:
   capturing an audio signal representative of a vocal utterance relative to a query from a speaker;
   identifying a speaker from the captured audio signal;
   generating a first obfuscated speaker name corresponding to the identified speaker and storing a list of correspondence between speaker names and obfuscated speaker names;
   providing to an external device the captured audio signal and the first obfuscated speaker name;
   obtaining from an external device an answer to the query; and
   in response to a determination that the received answer contains the first obfuscated speaker name, replacing, in the received answer, the first obfuscated speaker name by its corresponding name in the list.

10. The method of claim 9 further comprising providing the answer to the speaker.

11. The method of claim 9 wherein the received answer is in textual form.

12. The method of claim 9 wherein the received answer is in audio form.

13. The method of claim 9 further comprising obfuscating the captured audio signal by detecting a speaker name of the list and replacing it by an audio signal representative of the corresponding obfuscated speaker name.

14. The method of claim 9 further comprising a setting to turn an incognito mode on or off wherein in the first case, obfuscating the speaker name before providing it and de-obfuscating the received answer when it contains an obfuscated speaker name, and in the second case, no more obfuscating the speaker name and no more determining if the received answer contains an obfuscated speaker name.

15. The method of claim 9 further comprising renewing the obfuscated speaker names of the list.

16. A non-transitory computer readable medium comprising program code instructions executable by a processor for implementing the method comprising:
   capturing an audio signal representative of a vocal utterance relative to a query from a speaker;
   identifying a speaker from the captured audio signal;
   generating a first obfuscated speaker name corresponding to the identified speaker and storing a list of correspondence between speaker names and obfuscated speaker names;
   providing to an external device the captured audio signal and the first obfuscated speaker name;
   obtaining from an external device an answer to the query; and
   in response to a determination that the received answer contains the first obfuscated speaker name, replacing, in the received answer, the first obfuscated speaker name by its corresponding name in the list.

17. The medium of claim 16, wherein the method further comprises providing the answer to the speaker.

18. The medium of claim 16 wherein the received answer is in textual form.

19. The medium of claim 16 wherein the received answer is in audio form.

20. The medium of claim 16, wherein the method further comprises obfuscating the captured audio signal by detecting a speaker name of the list and replacing it by an audio signal representative of the corresponding obfuscated speaker name.

* * * * *